United States Patent
Tian et al.

(10) Patent No.: US 8,976,111 B2
(45) Date of Patent: Mar. 10, 2015

(54) ELECTRONIC DEVICE AND METHOD FOR OPERATING ELECTRONIC DEVICE

(71) Applicants: Beijing Lenovo Software Ltd., Beijing (CN); Lenovo (Beijing) Limited, Beijing (CN)

(72) Inventors: Chunyu Tian, Beijing (CN); Fenglang Li, Beijing (CN)

(73) Assignees: Beijing Lenovo Software, Ltd., Beijing (CN); Lenovo (Beijing) Limited, Beijing (CN)

( * ) Notice: Subject to any disclaimer, the term of this patent is extended or adjusted under 35 U.S.C. 154(b) by 50 days.

(21) Appl. No.: 13/845,722

(22) Filed: Mar. 18, 2013

(65) Prior Publication Data
US 2013/0257717 A1    Oct. 3, 2013

(30) Foreign Application Priority Data
Mar. 27, 2012    (CN) .......................... 2012 1 0084684

(51) Int. Cl.
G09G 5/00    (2006.01)
G06F 3/01    (2006.01)
G06F 1/16    (2006.01)

(52) U.S. Cl.
CPC ............... *G06F 3/01* (2013.01); *G06F 1/1615* (2013.01); *G06F 1/1654* (2013.01); *G06F 1/1677* (2013.01)

USPC .......................................... 345/156; 345/204

(58) Field of Classification Search
USPC ..................... 345/156, 204, 1.1–1.3
See application file for complete search history.

(56) References Cited

U.S. PATENT DOCUMENTS

| | | | |
|---|---|---|---|
| 8,755,181 B2* | 6/2014 | Okutsu .................... | 361/679.55 |
| 2010/0245209 A1* | 9/2010 | Miller et al. ................... | 345/1.3 |
| 2010/0321877 A1* | 12/2010 | Moser ....................... | 361/679.29 |
| 2011/0063785 A1* | 3/2011 | Yamagiwa et al. ...... | 361/679.01 |
| 2011/0299235 A1* | 12/2011 | Liu et al. .................. | 361/679.09 |
| 2012/0176746 A1* | 7/2012 | Chen et al. ............... | 361/679.55 |
| 2012/0194448 A1* | 8/2012 | Rothkopf ...................... | 345/173 |
| 2013/0271373 A1* | 10/2013 | Milhe et al. .................. | 345/168 |
| 2014/0049911 A1* | 2/2014 | Corbin et al. ............ | 361/679.58 |

\* cited by examiner

*Primary Examiner* — Ricardo L Osorio (57) ABSTRACT

Electronic devices and methods for operating the electronic devices are disclosed. The method for operating an electronic device includes a first body and a second body that can be magnetically connected with each other. The method including: obtaining an attachment position at which the first body is attached to the second body; controlling the electronic device to operate in a first mode when the first body is attached to the second body at a first attachment position; and controlling the electronic device to operate in a second mode when the first body is attached to the second body at a second attachment position. The first attachment position is different from the second attachment position, and the first mode is different from the second mode.

20 Claims, 5 Drawing Sheets

ELECTRONIC DEVICE AND METHOD FOR OPERATING ELECTRONIC DEVICE

TECHNICAL FIELD

The present invention relates to electronics technology, and more particularly, to electronic devices and methods for operating the electronic devices.

BACKGROUND

With global development of information technology, electronic devices and products are widely used in our daily lives. Many electronic devices and products, such as notebook computers, cell phones and PADs, become popular communication tools due to their portability.

In most cases, a single electronic device can be used in several ways. For example, a PAD can be used as a display when it is connected to a host, or as a standalone device when it is disconnected from the host.

The inventors have found at least the following disadvantages in the conventional electronic device designs.

Conventionally, an electronic device cannot operate in different modes in accordance with different connection states and connection directions between its host and display. Thus, the electronic device can be used in limited scenarios, resulting in poor user experience.

In addition, the host of the electronic device is typically connected with the display via a mechanical shaft or hinge. Thus, it is inconvenient to change the angle between them or disconnect the display from the host.

SUMMARY

An object of the present invention is to provide electronic devices capable of operating in different modes in accordance with different connection states and connection directions between a host and a display, and methods for operating the electronic devices.

In an aspect, according to an embodiment of the present invention, a method for operating an electronic device is provided. The electronic device includes a first body and a second body that can be magnetically connected with each other. The method includes: obtaining an attachment position at which the first body is attached to the second body; controlling the electronic device to operate in a first mode when the first body is attached to the second body at a first attachment position; and controlling the electronic device to operate in a second mode when the first body is attached to the second body at a second attachment position. The first attachment position is different from the second attachment position, and the first mode is different from the second mode.

Further, obtaining an attachment position at which the first body is attached to the second body includes: generating a pulse signal in response to a movable contact provided at the attachment position being pressed, when the first body is being attached to the second body; and obtaining the attachment position based on the pulse signal.

Further, obtaining an attachment position at which the first body is attached to the second body includes: obtaining the attachment position from a sensor provided at the attachment position when the first body is being attached to the second body.

Further, the first body includes a first system including a first hardware system and a first operating system running on the first hardware system.

Further, the first body includes: a first magnet including a first magnet component and a second magnet component. The first magnet component and the second magnet component are connected in a wedge-shaped arrangement at a first end of the first body, or provided separately at the first end of the first body.

Further, the second body includes: a second magnetic device including a first magnetic sub-device corresponding to the first magnet component and a second magnetic sub-device corresponding to the second magnet component. The electronic device operates in the first mode when the first body is attached to the second body by attraction between the first magnet component and the first magnetic sub-device. The electronic device operates in the second mode when the first body is attached to the second body by attraction between the second magnet component and the second magnetic sub-device.

Further, controlling the electronic device to operate in a first mode when the first body is attached to the second body at a first attachment position includes: determining that a connection between the first body and the second body is in a first connection state when the first body is attached to the second body at the first attachment position. The first system enters a normal operation mode in response to the first connection state.

Further, controlling the electronic device to operate in a second mode when the first body is attached to the second body at a second attachment position includes: determining that a connection between the first body and the second body is in a second connection state when the first body is attached to the second body at the second attachment position. The first system enters an abnormal operation mode in response to the second connection state.

Further, the method includes, after obtaining an attachment position at which the first body is attached to the second body: judging whether a first attachment point in the first body is connected to a second attachment point in the second body; controlling the electronic device to operate as a notebook computer if it is judged that the first attachment point is connected to the second attachment point; controlling the electronic device to operate as a tablet computer if it is judged that the first attachment point is not connected to the second attachment point.

Further, the second body includes: a display; a second system including a second hardware system and a second operating system running on the second hardware system. Controlling the electronic device to operate in a first mode when the first body is attached to the second body at a first attachment position includes: determining, by each of the first and second systems, that a connection between the first body and the second body is in a first connection state when the first body is attached to the second body at the first attachment position; controlling, by the first system, a change in its own system state in accordance with a predetermined policy based on its own system state information and the first connection state; controlling, by the second system, a change in its own system state in accordance with a predetermined policy based on its own system state information and the first connection state. Controlling the electronic device to operate in a second mode when the first body is attached to the second body at a second attachment position includes: determining, by each of the first and second systems, that a connection between the first body and the second body is in a second connection state when the first body is attached to the second body at the second attachment position; controlling, by the first system, a change in its own system state in accordance with a predetermined policy based on its own system state information and the second connection state; controlling, by the second system, a change in its own system state in accordance with a predetermined policy based on its own system state information and the second connection state.

The method further includes: prior to obtaining the attachment position at which the first body is attached to the second body, controlling the first body and the second body to enter an attached state based on a force balance between the first body and the second body.

Further, the force balance is obtained from an equation $F_1 \times L_1 = F_2 \times L_2 + G \times L_3$, where $F_1$ denotes a magnetic force between the first body and the second body, $L_1$ denotes a length of arm of the force $F_1$ from a force application center, $F_2$ denotes a force applied by a user on the second body, $L_2$ denotes a length of arm of the force $F_2$ from the force application center, G denotes a gravity force applied on the second body, and $L_3$ denotes a length of arm of the gravity force from the force application center.

In a further aspect, an electronic device is provided. The electronic device includes: a first body; a second body, the first and second bodies can be magnetically connected to each other; an obtaining module configured to obtain an attachment position at which the first body is attached to the second body; a first control module configured to control the electronic device to operate in a first mode when the first body is attached to the second body at a first attachment position; and a second control module configured to control the electronic device to operate in a second mode when the first body is attached to the second body at a second attachment position. The first attachment position is different from the second attachment position, and the first mode is different from the second mode.

Further, the obtaining module includes: a generating unit configured to generate a pulse signal in response to a movable contact provided at the attachment position being pressed when the first body is being attached to the second body; and an obtaining unit configured to obtain the attachment position based on the pulse signal.

Further, the obtaining unit is configured to: obtain the attachment position from a sensor provided at the attachment position when the first body is being attached to the second body.

Further, the first body includes a first system including a first hardware system and a first operating system running on the first hardware system.

Further, the first body includes: a first magnet including a first magnet component and a second magnet component. The first magnet component and the second magnet component are connected in a wedge-shaped arrangement at a first end of the first body, or provided separately at the first end of the first body.

Further, the second body includes: a second magnetic device including a first magnetic sub-device corresponding to the first magnet component and a second magnetic sub-device corresponding to the second magnet component. The electronic device operates in the first mode when the first body is attached to the second body by attraction between the first magnet component and the first magnetic sub-device. The electronic device operates in the second mode when the first body is attached to the second body by attraction between the second magnet component and the second magnetic sub-device.

Further, the first control module includes: a first determining unit configured to determine that a connection between the first body and the second body is in a first connection state when the first body is attached to the second body at the first attachment position; and a first responding unit configured to cause the first system to enter a normal operation mode in response to the first connection state.

Further, the second control module includes: a second determining unit configured to determine that a connection between the first body and the second body is in a second connection state when the first body is attached to the second body at the second attachment position; and a second responding unit configured to cause the first system to enter an abnormal operation mode in response to the second connection state.

Further, the electronic device includes: a judging module configured to judge whether a first attachment point in the first body is connected to a second attachment point in the second body after the obtaining modules obtains the attachment position at which the first body is attached to the second body; a third control module configured to control the electronic device to operate as a notebook computer if the judging unit judges that the first attachment point is connected to the second attachment point; a fourth control module configured to control the electronic device to operate as a tablet computer if the judging unit judges that the first attachment point is not connected to the second attachment point.

Further, the second body includes: a display; a second system including a second hardware system and a second operating system running on the second hardware system. The first control module is configured to cause: each of the first and second systems to determine that a connection between the first body and the second body is in a first connection state when the first body is attached to the second body at the first attachment position; the first system to control a change in its own system state in accordance with a predetermined policy based on its own system state information and the first connection state; the second system to control a change in its own system state in accordance with a predetermined policy based on its own system state information and the first connection state. The second control module is configured to cause: each of the first and second systems to determine that a connection between the first body and the second body is in a second connection state when the first body is attached to the second body at the second attachment position; the first system to control a change in its own system state in accordance with a predetermined policy based on its own system state information and the second connection state; the second system to control a change in its own system state in accordance with a predetermined policy based on its own system state information and the second connection state.

In a still further aspect, an electronic device is provided. The electronic device includes: a first body including a first casing and a first connector provided inside the first casing or on a surface of the first casing; and a second body including a second casing and a second connector provided inside the first casing or on a surface of the second casing. The first body and the second body are in a first connection state when the first connector is magnetically connected to the second connector at a first connection position and the first body and the second body are in a second connection state when the first connector is magnetically connected to the second connector at a second connection position. The first connection state is different from the second connection state.

Further, the first connector is made of a magnet.

Further, the first connector includes a first sub-connector, a second sub-connector and a third sub-connector.

Further, the second connector is made of a magnet or a metal.

Further, the second connector includes a fourth sub-connector, a fifth sub-connector and a sixth sub-connector. The fourth sub-connector corresponds to the first sub-connector, the fifth sub-connector corresponds to the second sub-connector and the sixth sub-connector corresponds to the third sub-connector.

Further, the first connection position includes a position at which the first sub-connector is connected to the fourth sub-connector.

Further, the first connection state includes a state in which the first body and the second body are folded together.

Further, the second connection position includes a position at which the second sub-connector is connected to the fifth sub-connector.

Further, the second connection state includes a state in which the first body and the second body are unfolded and placed in co-plane.

Further, the first body and the second body are in a third connection state when the third sub-connector is connected to the sixth sub-connector via a magnetic connection. The third connection state includes a third state in which the first body and the second body are in a state different from the folded state and the co-plane state.

Further, the first sub-connector, the second sub-connector and the third sub-connector are connected in a wedge-shaped arrangement at a first end of the first body, or provided separately at the first end of the first body.

Further, the first connector includes a first attachment point.

Further, the second connector includes a second attachment point and a third attachment point different from the second attachment point.

Further, the first body and the second body are connected in a forward direction or a reverse direction.

Further, when the first body and the second body are connected in the forward direction, the first attachment point is attached to the second attachment point.

Further, when the first body and the second body are connected in the reverse direction, the first attachment point is attached to the third attachment point.

One or more of embodiments of the present application have at least the following technical effects or advantages.

In some embodiments of the present application, when the host and the display of the electronic device are connected with each other, the electronic device can operate in different states in accordance with different connection states between the host and the display. For example, if the host and the display are connected at an angle of 0°, the electronic device will be in a power-off state; if the host and the display are connected at an angle of 135°, the electronic device will be in a power-on state. In this way, the electronic device can be used in more to diversified scenarios, and user experience can be improved.

In some embodiments of the present application, the host and the display are magnetically connected, without need for connection based on mechanical structure. In this way, it is more convenient to change the angle between the host and the display and to disconnect the display from the host.

In some embodiments of the present application, when the host and the display of the electronic device are connected with each other, the electronic device can operate in different states in accordance with different directions along which the host and the display are connected. For example, when the host and the display are connected in a forward direction, the electronic device can operate in a normal mode; when the host and the display are connected in a reverse direction, the display of the electronic device can operate in a PAD mode as a standalone device. In this way, user experience can be improved.

In some embodiments of the present application, the host and the display can be in a balanced state at a particular angle, depending on a balance among a magnetic force between the host and the display, a gravity force applied on the display and a pressing force applied by the user on the display. In this way, the balance between the host and the display can be enhanced.

DETAILED DESCRIPTION OF THE EMBODIMENTS

In the following, the idea, embodiments and advantages of the present application will be detailed with reference to the figures, such that the present application will be more apparent to those skilled in the art.

First Embodiment

According to this embodiment of the present invention, a method for operating an electronic device is provided. The method is applied in an electronic device including a first body and a second body that can be magnetically connected with each other.

Components of the electronic device will be first explained.

The electronic device may be a desktop computer, a notebook computer or a cell phone. Generally, the electronic device includes:

a first body, which may be a host part, a keyboard or a touchpad of a computer;

a second body, which may be a display of a computer or a tablet computer; and connectors, among which at least a first connector is provided on the first body and at least a second connector corresponding to the first connector is provided on the second body. Herein, the first body can be attached to the second body by attaching the first connector to the second connector.

Figure 1:
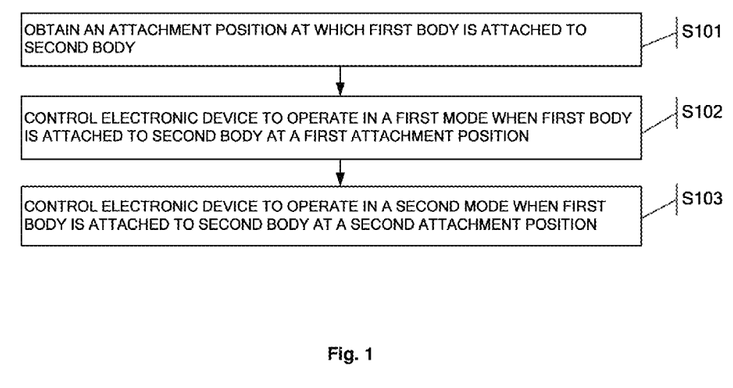
FIG. 1 is a flowchart illustrating a method for operating an electronic device according to a first embodiment of the present application.

As shown in FIG. 1, the method for operating the electronic device includes the following steps.

At step S101, an attachment position at which the first body is attached to the second body is obtained.

The attachment position may be obtained in various ways.

For example, different movable contacts may be provided at different attachment positions on the first and second connector and used to generate different pulse signals. When the first connector is attached to the second connector, some of the contacts will be pressed inwards, and a corresponding pulse signal will be generated. In this way, the first or second body may determine the attachment position.

Alternatively, a sensor may be provided on the surface of the first or second connector. When the first connector is attached to the second connector, the sensor will be triggered to detect the position at which the first connector is attached to the second connector.

Other approaches for obtaining the attachment position may also be used depending on practical requirements. The present application is not limited to any specific approach for obtaining the attachment position.

Figure 2:
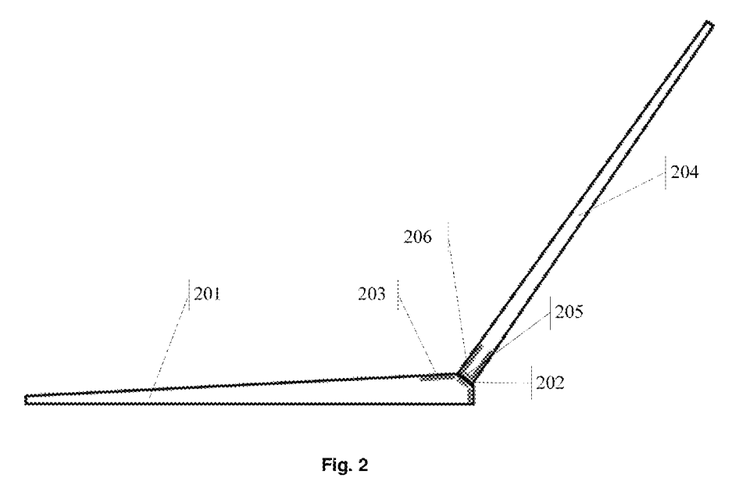
FIG. 2 is a schematic diagram showing configuration of the first body and the second body when they are attached to each other at a first attachment position according to the first embodiment of the present application.

In an example, the first body may be a host part of a computer. In this case, the first body includes a first system including a first hardware system and a first operating system running on the first hardware system As shown in FIG. 2, the first body 201 may further include at least one first to magnet each including a first magnet component 202 and a second magnet component 203. The first magnet component 202 and the second magnet component 203 are connected in a wedge-shaped arrangement at a first end of the first body 201, or provided separately at the first end of the first body 201. In other words, there may or may not be a space between the first magnet component 202 and the second magnet component 203. The present application is not limited in terms of how to arrange the first magnet component 202 and the second magnet component 203 on the first body 201, or the number of magnet components provided in the first body 201.

The second body 204 includes a second magnetic device including a first magnetic sub-device 205 corresponding to the first magnet component 202 and a second magnetic sub-device 206 corresponding to the second magnet component 203. The first magnetic sub-device 205 and the second magnetic sub-device 206 may be a single sub-device or different sub-devices.

The second magnetic device may be made of a magnet or a metal such as copper or iron. If the second magnetic device is made of a magnet, the magnetic polarities of the first magnet component 202 and the first magnetic sub-device 205 are opposite to each other, and the magnetic polarities of the second magnet component 203 and the second magnetic sub-device 206 are opposite to each other. In addition, the first magnet may include a number of magnet components, and correspondingly, the second magnetic device may include a number of magnetic sub-devices. Further, the positions of the first magnet in the first body 201 and the second magnetic device in the second body 204 may be interchangeable. The present application is not limited to any specific arrangement of the magnetic devices in the first body 201 and the second body 204.

At step S102, the electronic device is controlled to operate in a first mode when the first body is attached to the second body at a first attachment position.

As shown in FIG. 2, when the first body 201 is attached to the second body 204 through attraction between the first magnet component 202 and the first magnetic sub-device 205, the position at which the first magnet component 202 is attached to the first magnetic sub-device 205 is the first attachment position. At this time, the first body 201 and the second body 204 are in a second connection state in which they are connected at an angle of 135°. In this case, the user may want to use the electronic device and thus control the electronic device to operate in a normal mode. For example, when the user unfolds the display from the host, the electronic device may be automatically powered on.

At step S103, the electronic device is controlled to operate in a second mode when the first body is attached to the second body at a second attachment position. The first attachment position is different from the second attachment position, and the first mode is different from the second mode.

Figure 3:
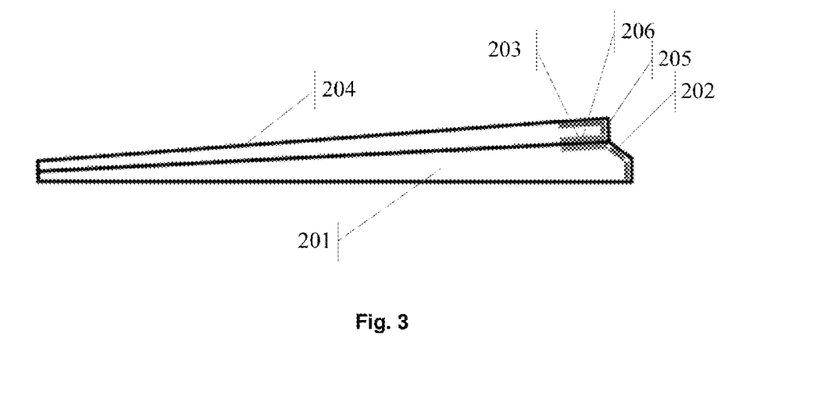
FIG. 3 is a schematic diagram showing configuration of the first body and the second body when they are attached to each other at a second attachment position according to the first embodiment of the present application.

As shown in FIG. 3, when the first body 201 is attached to the second body 204 through attraction between the second magnet component 203 and the second magnetic sub-device 206, the position at which the second magnet component 203 is attached to the second magnetic sub-device 206 is the second attachment position. At this time, the first body 201 and the second body 204 are in a first connection state in which they are connected at an angle of 0°. In this case, the user does not use the electronic device and thus controls the electronic device to operate in an abnormal mode. For example, after the user uses the electronic device, the electronic device may be automatically powered off or enter a standby or power-saving state in response to the connection state between the first body 201 and the second body 204.

The present application is not limited in terms of what operation mode the electronic device may have when the first body 201 and the second body 204 are in the first connection state or the second connection state. In addition, the present application is not limited to any specific angle between the first body 201 and the second body 204 in the first connection state or the second connection state. The angle may be 0°, 90°, 135°, 180° or any other angle.

In an embodiment, the relationship between the first body and the second body is reciprocal, and thus the first body and the second body may be exchangeable with each other.

Second Embodiment

In the first embodiment, the method for operating the electronic device has been described in a scenario in which the first body is a host part. However, the host part of the electronic device may be the first body or the second body.

Figure 4:
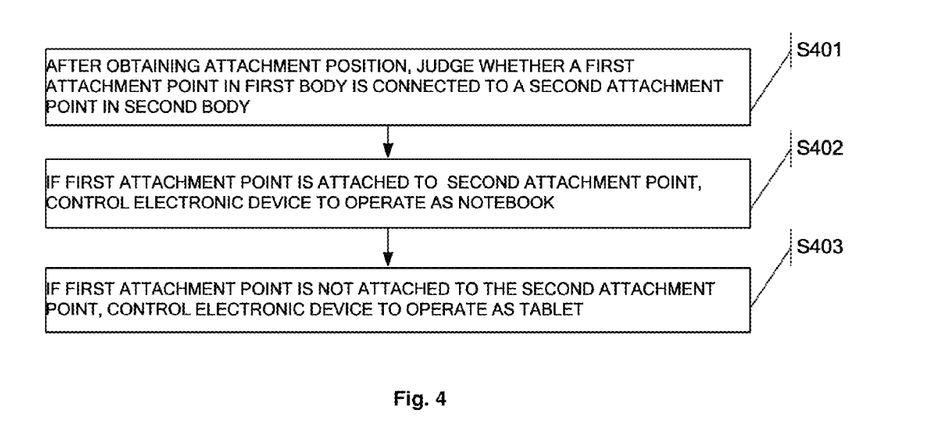
FIG. 4 is a flowchart illustrating a process of controlling an operation state of a to electronic device according to a second embodiment of the present application.

Since the host part may be located in the first body or in the second body, it is possible to judge which operation state the electronic device will enter in accordance with the process shown in FIG. 4.

At step S401, after the attachment position at which the first body is attached to the second body is obtained, it is judged whether a first attachment point in the first body is attached to a second attachment point in the second body.

Figure 5:
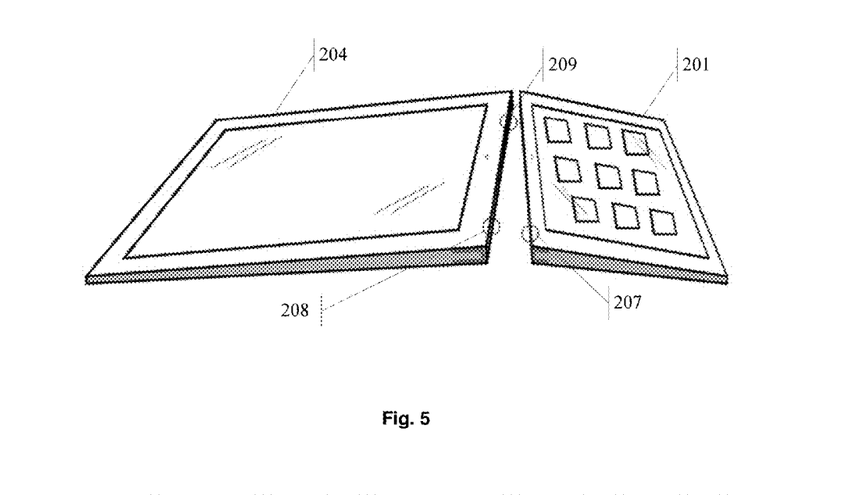
FIG. 5 is a schematic diagram showing a relationship between a first attachment point, a second attachment point and a third attachment point according to the second embodiment of the present application.

As shown in FIG. 5, the first body 201 includes a first attachment point 207, and the second body 204 includes a second attachment point 208 and a third attachment point 209. When the second body 204 (i.e., the display) is connected to the first body 201 in the forward direction, the first attachment point 207 is connected to the second attachment point 208. When the second body 204 is connected to the first body 201 in the reverse direction, the first attachment point 207 is connected to the third attachment point 209.

At step S402, if it is judged that the first attachment point is attached to the second attachment point, the electronic device is controlled to operate as a notebook computer.

When the first attachment point 207 is attached to the second attachment point 208, the first body 201 is connected to the second body 204 in the forward direction. In this case, the first body 201 serves as a host and the second body 204 serves as a display. The electronic device as a whole may be used as a notebook computer.

At step S403, if it is judged that the first attachment point is not attached to the second attachment point, the electronic device is controlled to operate as a tablet computer.

When the first attachment point 207 is attached to the third attachment point 209 instead of the second attachment point 208, the first body 201 is not in use. In this case, the second body 204 may be used as a tablet computer.

Different operating systems may be used when the first body 201 and the second body 204 are connected differently depending on design requirements. The present application is not limited in terms of which operating system is used in which connection state.

The second body may further include a display and a second system including a second hardware system, and a second operating system capable of running on the second hardware system.

In this case, the first body 201 includes the first operating system, and the second body 204 includes the second operating system, such as a hybrid system. Either the first operating system or the second operating system may be executed in the electronic device. In another example, the first body 201 is a keyboard, and the second body 204 is provided with ARM hardware plus an Android system. In either case, it is possible to judge which operation state the electronic device will enter in accordance with the above method.

The operation mode of the electronic device can be controlled as follows whether it operates as a notebook computer or a tablet computer.

each of the first and second systems determine that a connection between the first body 201 and the second body 204 is in a first connection state when the first body 201 is attached to the second body 204 at the first attachment position The first system controls a change in its own system state in accordance with a predetermined policy based on its own system state information and the first connection state.

The second system controls a change in its own system state in accordance with a predetermined policy based on its own system state information and the first connection state.

The step of controlling the electronic device to operate in a second mode when the first body 201 is attached to the second body 204 at a second attachment position includes: determining, by each of the first and second systems, that a connection between the first body 201 and the second body 204 is in a second connection state when the first body 201 is attached to the second body 204 at the second attachment position.

The first system controls a change in its own system state in accordance with a predetermined policy based on its own system state information and the second connection state.

The second system controls a change in its own system state in accordance with a predetermined policy based on its own system state information and the second connection state.

The predetermined policies may be the policies described in the first embodiment or any other policy. The present application is not limited thereto. The operations modes of the electronic device corresponding to the connection between the first body 201 and the second body 204 have been described in the first embodiment. The policies of this embodiment is similar to that in the first embodiment except that two systems are included, and thus the first and second bodies are each required to detect the connection position.

Third Embodiment

With the connection states between the first body 201 and the second body 204 in the first and second embodiments of the present application, the first body 201 can be attached to the second body 204 at a force balance state, and will not fall off from the second body 204.

The force balance is based on an equation $F_1 \times L_1 = F_2 \times L_2 + G \times L_3$, where $F_1$ denotes a magnetic force between the first body and the second body, $L_1$ denotes a length of arm of the force $F_1$ from a force application center, $F_2$ denotes a force applied by a user on the second body, $L_2$ denotes a length of arm of the force $F_2$ from the force application center, G denotes a gravity force applied on the second body, and $L_3$ denotes a length of arm of the gravity force from the force application center.

Figure 6:
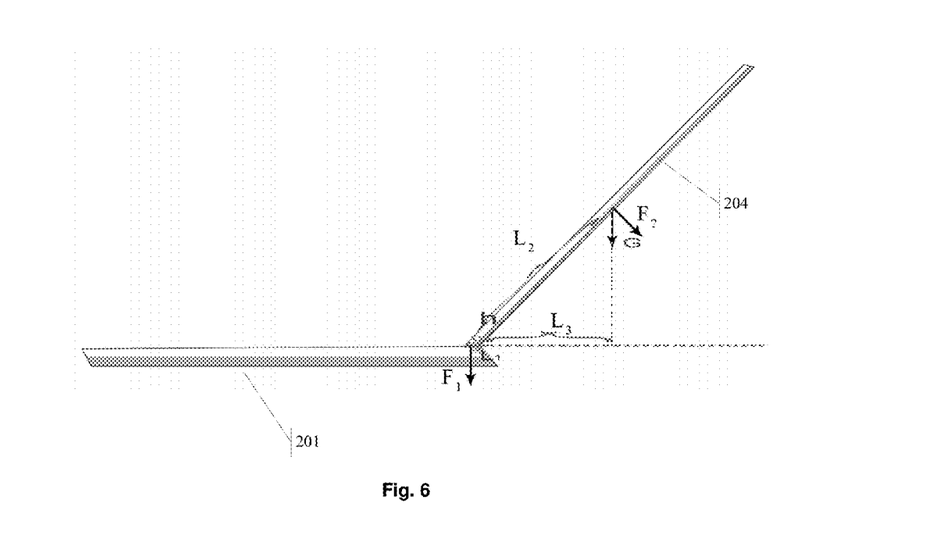
FIG. 6 is a schematic diagram showing application of forces when the first body and the second body are connected at an angle of 135° according to a third embodiment of the present application.

FIG. 6 is a diagram showing forces between the first body 201 and the second body 204 when the first body 201 and the second body 204 are connected at an angle of 135°.

It is assumed that the electronic device is a 11-inch notebook computer having the following parameters:
① Length: 296 mm; Width: 184 mm; Height of the first body 201: 10 mm; Height of the second body 204: 5 mm;
② Weight of the screen: 300 g (i.e., m=0.3 kg).

Experimentally, an average value of pressing force applied by an ordinary adult's finger on the screen is 8N, i.e., $F_2$=8N.

It can be concluded from FIG. 6 that:

$L_1 = 0.5 \times h / \cos 45°$, $L_2 = 0.5 \times L - 0.5 \times h \times \tan 45°$, and $L_3 = 0.5 \times L \times \sin 45° - L_1$.

Substituting the above parameters of the notebook computer into the equation $F_1 \times L_1 = F_2 \times L_2 + G \times L_3$ yields $F_1 \approx 46N$. That is, a stable attachment between the first body 201 and the second body 204 can be obtained when the magnetic force between the first body 201 and the second body 204 exceeds 146N.

The same force application analysis applies to other angles such as 0° and 90°. The description thereof will be omitted here.

Fourth Embodiment

Figure 7:
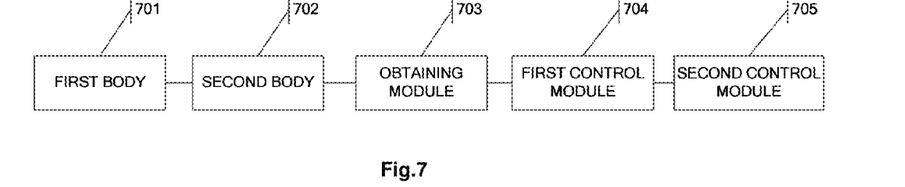
FIG. 7 is a block diagram of an electronic device according to a fourth embodiment of the present application.

According to the fourth embodiment of the present application, an electronic device is provided. As shown in FIG. 7, the electronic device includes: a first body 701; a second body 702 which can be magnetically connected with the first body 701; an obtaining module 703 configured to obtain an attachment position at which the first body 701 is attached to the second body 702; a first control module 704 configured to control the electronic device to operate in a first mode when the first body 701 is attached to the second body 702 at a first attachment position; and a second control module 705 configured to control the electronic device to operate in a second mode when the first body 701 is attached to the second body 702 at a second attachment position. The first attachment position is different from the second attachment position, and the first mode is different from the second mode.

Here, the first control module 704 and the second control module 705 may be implemented as a single control module, i.e., a single processing module.

Further, the obtaining module 703 includes: a generating unit configured to generate a pulse signal in response to a movable contact provided at the attachment position being pressed, when the first body 701 is being attached to the second body 702; and an obtaining unit configured to obtain the attachment position based on the pulse signal.

Further, the obtaining unit 703 is configured to obtain the attachment position from a sensor provided at the attachment position when the first body 701 is being attached to the second body 702.

Further, the first body 701 includes a first system including a first hardware system and a first operating system capable of running on the first hardware system.

Further, the first body 701 includes a first magnet including a first magnet component and a second magnet component. The first magnet component and the second magnet component are connected in a wedge-shaped arrangement at a first end of the first body, or provided separately at the first end of the first body.

Further, the second body 702 includes a second magnetic device including a first magnetic sub-device corresponding to the first magnet component and a second magnetic sub-device corresponding to the second magnet component. The electronic device operates in the first mode when the first magnet component is attracted to the first magnetic sub-device such that the first body 701 is connected to the second body 702.

Further, the first control module 704 includes a first determining unit configured to determine that a connection between the first body 701 and the second body 702 is in a first connection state when the first body 701 is attached to the second body 702 at the first attachment position; and a first responding unit configured to cause the first system to enter a normal operation mode in response to the first connection state.

Further, the second control module 705 includes a second determining unit configured to determine that a connection between the first body 701 and the second body 702 is in a second connection state when the first body 701 is attached to the second body 702 at the second attachment position; and a second responding unit configured to cause the first system to enter an abnormal operation mode in response to the second connection state.

Further, the electronic device includes a judging module configured to judge whether a first attachment point in the first body 701 is attached to a second attachment point in the second body 702 after the obtaining modules obtains the attachment position at which the first body 701 is attached to the second body 702; a third control module configured to control the electronic device to operate as a notebook computer if the judging unit judges that the first attachment point in the first body 701 is attached to the second attachment point in the second body 702; a fourth control module configured to control the electronic device to operate as a tablet computer if the judging unit judges that the first attachment point in the first body 701 is not attached to the second attachment point in the second body 702.

Further, the second body 702 includes: a display; a second system including a second hardware system and a second operating system running on the second hardware system. The first control module 704 is configured to cause each of the first and second systems to determine that a connection between the first body 701 and the second body 702 is in a first connection state when the first body 701 is attached to the second body 702 at the first attachment position, to cause the first system to control a change in its own system state in accordance with a predetermined policy based on its own system state information and the first connection state, and to cause the second system to control a change in own system state in accordance with a predetermined policy based on its own system state information and the first connection state. The second control module 705 is configured to cause each of the first and second systems to determine that a connection between the first body 701 and the second body 702 is in a second connection state when the first body 701 is attached to the second body 702 at the second attachment position, to cause the first system to control a change in its own system state variation in accordance with a predetermined policy based on its own system state information and the second connection state, and to cause the second system to control a change in its own system state in accordance with a predetermined policy based on its own system state information and the second connection state.

The electronic device in this embodiment may be the electronic device in any of the first, second and third embodiments of the present application. Thus, based on the above description of the methods in the first, second and third embodiments, those skilled in the art will understand the structure of the electronic device of this embodiment and various variants thereof.

Fifth Embodiment

Figure 8:
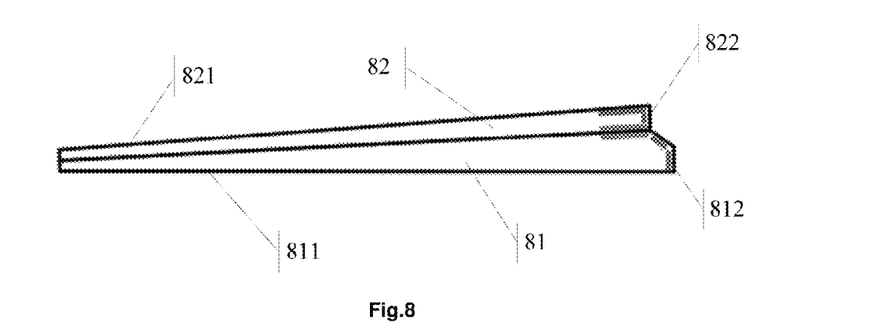
FIG. 8 is a block diagram of a electronic device according to a fifth embodiment of the present application.

As shown in FIG. 8, an electronic device includes: a first body 81 including a first casing 811 and a first connector 812 provided inside the first casing or on a surface of the first casing; and a second body 82 including a second casing 821 and a second connector 822 provided inside the second casing or on a surface of the second casing. The first body 81 and the second body 82 are in a first connection state when the first connector 812 is magnetically connected to the second connector 822 at a first connection position and the first body 81 and the second body 82 are in a second connection state when the first connector 812 is magnetically connected to the second connector 822 at a second connection position. The first connection state is different from the second connection state.

In an embodiment, the first connector is made of a magnet.

Figure 9:
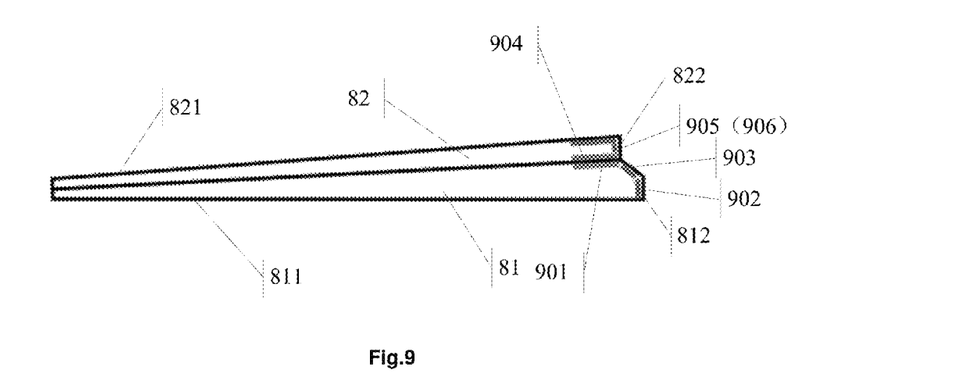
FIG. 9 is a schematic diagram showing configuration of the first body and the second body of an electronic device in a folded state according to the fifth embodiment of the present application.

Further, as shown in FIG. 9, the first connector 812 includes a first sub-connector 901, a second sub-connector 902 and a third sub-connector 903. The first connector 812 may include more or less sub-connectors. The present application is not limited to any specific number of sub-connectors.

In an embodiment, the first sub-connector 901, the second sub-connector 902 and the third sub-connector 903 are connected in a wedge-shaped arrangement at a first end of the first body 81, or provided separately at the first end of the first body 81.

In an embodiment, the second connector 822 is made of a magnet or a metal.

In an embodiment, as shown in FIG. 9, the second connector 822 includes a fourth sub-connector 904, a fifth sub-connector 905 and a sixth sub-connector 906. The fourth sub-connector 904 corresponds to the first sub-connector 901, the fifth sub-connector 905 corresponds to the second sub-connector 902 and the sixth sub-connector 906 corresponds to the third sub-connector 903.

In an embodiment, the first connection position indicates a position at which the first sub-connector 901 is connected to the fourth sub-connector 904.

As shown in FIG. 9, the first connection state is a state in which the first body 81 and the second body 82 are folded together.

In an embodiment, the second connection position indicates a position at which the second sub-connector 902 is connected to the fifth sub-connector 905.

Figure 10:
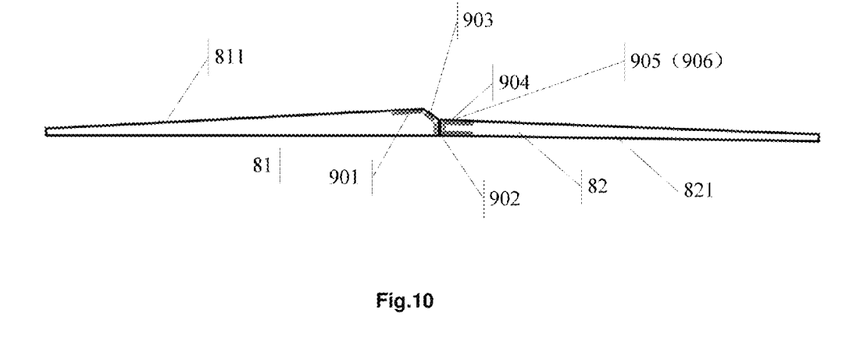
FIG. 10 is a schematic diagram showing configuration of when the first body and the second body of an electronic device in a co-plane state according to the fifth embodiment of the present application.

As shown in FIG. 10, the second connection state includes a state in which the first body 81 and the second body 82 are unfolded and placed in co-plane.

Further, the first body 81 and the second body 82 may be in a third connection state when the third sub-connector is magnetically connected to the sixth sub-connector. The third connection state may be a state other than the above folded state and the co-plane state. Referring to FIG. 2, which is a diagram showing the structure of the electronic device when the first body and the second body are connected at an angle of 135°. The first body 81 and the second body 82 may have various connection states, such as at an angle of 0°, 65°, 90° or 180°, depending on arrangement of the first sub-connector 901, the second sub-connector 902, the third sub-connector 903, the fourth sub-connector 904, the fifth sub-connector 905 and the sixth sub-connector 906. The present application is not limited thereto. In an alternative embodiment, the first body 81 and the second body 82 each may be a PAD or tablet computer having display and processing functions. When the first body 81 and the second body 82 is connected at an angle of about 180°, i.e., placed in co-plane, the first body 81 may be integrated with the second body 82 to provide a large display formed by the respective displays of the first and second bodies 81 and 82. For example, an image or parts of an image may be displayed on the first and second bodies 81 and 82, respectively. When the two bodies are connected at about 180° to form a large display, the image may be tiled over the large display, or the image parts may be displayed as in combination with each other.

On the other hand, when the first and second bodies 81 and 82 are connected at an angle of 90°, for example, they may operate as a notebook computer, with one of them acting as a host and the other one acting as a display. In an example where the first and second bodies 81 and 82 are PADs, one of the PADs may at least act as an input unit, which may be embodied as a touchpad formed by a touch-sensing unit of the PAD. In this way, a user may input content perform operations via the touchpad, and the inputted content or the operation result may be displayed on the other PAD acting as a display. Alternatively, the PAD acting as the input unit may display a user interface including at least one of a virtual keyboard and a virtual touchpad. In this way, the user may input content or perform operations by touching or clicking on the user interface, and the inputted content or the operation result may be displayed on the other PAD acting as a display.

In an embodiment, the first connector 812 may further include a first attachment point. The second connector 822 may further include a second attachment point and a third attachment point different from the second attachment point.

In an embodiment, the first body and the second body may be connected in a forward direction or a reverse direction.

Referring to FIG. 5, in an embodiment, when the first body 81 (201) and the second body 82 (204) are connected in the forward direction, the first attachment point 207 is attached to the second attachment point 208.

In an embodiment, when the first body 81 (201) and the second body 82 (204) are connected in the reverse direction, the first attachment point 207 is attached to the third attachment point 209.

The electronic device in this embodiment belongs to the same general inventive concept as the electronic device in any of the first, second and third embodiments of the present application. Thus, based on the description of the first, second and third embodiments of the present application, those skilled in the art will understand the structure of the electronic device of this embodiment and various variants thereof.

While the preferred embodiments of the present application have been described, further modifications and alternations can be made by those skilled in the art benefiting from the fundamental inventive concept of the present application. Thus, the claims as attached are intended to cover these preferred embodiments as well as all modifications and alternations within the scope of the present application.

Various alternatives and variants can be made by those skilled in the art without departing from the spirit and scope of the present application. These modifications and variants are to be encompassed by the scope of the present application if they fall into the scope of the claims and their equivalents.

What is claimed is:

1. A method for operating an electronic device, the electronic device comprising a first body and a second body which can be coupled with each other, the method comprising:

obtaining an attachment position at which the first body is attached to the second body;

controlling the electronic device to operate in a first mode when the first body is attached to the second body at a first attachment position; and controlling the electronic device to operate in a second mode when the first body is attached to the second body at a second attachment position, wherein the first attachment position is different from the second attachment position, and the first mode is different from the second mode;

wherein the first body further comprises a first connection device comprising a first connector and a second connector, wherein the first connector and the second connector are coupled in a wedge-shaped arrangement at a first end of the first body, or arranged separately at the first end of the first body;

wherein the second body comprises a second connection device comprising a first sub-connector corresponding to the first connector and a second sub-connector corresponding to the second connector, wherein the electronic device operates in the first mode when the first body is attached to the second body by connection between the first connector and the first sub-connector, and wherein the electronic device operates in the second mode when the first body is attached to the second body by connection between the second connector and the second sub-connector.

2. The method of claim 1, wherein said obtaining an attachment position at which the first body is attached to the second body comprises:

generating a pulse signal in response to a movable contact provided at the attachment position being pressed when the first body is being attached to the second body; and obtaining the attachment position at which the first body is attached to the second body based on the pulse signal.

3. The method of claim 1, wherein said obtaining an attachment position at which the first body is attached to the second body comprises:

obtaining the attachment position from a sensor provided at the attachment position when the first body is being attached to the second body.

4. The method of claim 1, wherein the first body comprises a first system comprising a first hardware system and a first operating system running on the first hardware system.

5. The method of claim 1, wherein the first connection device comprises
a first magnet, the first connector comprising a first magnet component, and the second connector comprising a second magnet component.

6. The method of claim 1, wherein the second connection device comprises a second magnetic device,
the first sub-connector comprising a first magnetic sub-device corresponding to the first magnet component, and the second sub-connector comprising a second magnetic sub-device corresponding to the second magnet component,
wherein the electronic device operates in the first mode when the first body is attached to the second body by attraction between the first magnet component and the first magnetic sub-device,
wherein the electronic device operates in the second mode when the first body is attached to the second body by attraction between the second magnet component and the second magnetic sub-device.

7. The method of claim 1, wherein said controlling the electronic device to operate in a first mode when the first body is attached to the second body at a first attachment position comprises:
determining that a connection between the first body and the second body is in a first connection state when the first body is attached to the second body at the first attachment position, and
the first system enters a normal operation mode in response to the first connection state.

8. The method of claim 1, wherein said controlling the electronic device to operate in a second mode when the first body is attached to the second body at a second attachment position comprises:
determining that a connection between the first body and the second body is in a second connection state when the first body is attached to the second body at the second attachment position, and
the first system enters an abnormal operation mode in response to the second connection state.

9. The method of claim 1, further comprising, after obtaining an attachment position at which the first body is attached to the second body:
judging whether a first attachment point in the first body is connected to a second attachment point in the second body;
controlling the electronic device to operate as a notebook computer if it is judged that the first attachment point in the first body is connected to the second attachment point in the second body;
controlling the electronic device to operate as a tablet computer if it is judged that the first attachment point in the first body is not connected to the second attachment point in the second body.

10. The method of claim 1, wherein the second body further comprises:
55a display;
a second system comprising a second hardware system and a second operating system running on the second hardware system;
wherein said controlling the electronic device to operate in a first mode when the first body is attached to the second body at a first attachment position comprises:
determining, by each of the first and second systems, that a connection between the first body and the second body is in a first connection state when the first body is attached to the second body at the first attachment position;
controlling, by the first system, a change in its own system state in accordance with a predetermined policy based on its own system state information and the first connection state;
controlling, by the second system, a change in its own system state in accordance with a predetermined policy based on its own system state information and the first connection state, and
wherein said controlling the electronic device to operate in a second mode when the first body is attached to the second body at a second attachment position comprises:
determining, by each of the first and second systems, that a connection between the first body and the second body is in a second connection state when the first body is attached to the second body at the second attachment position;
controlling, by the first system, a change in its own system state in accordance with a predetermined policy based on its own system state information and the second connection state;
controlling, by the second system, a change in its own system state in accordance with a predetermined policy based on its own system state information and the second connection state.

11. The method of claim 1, further comprising, prior to obtaining the attachment position at which the first body is attached to the second body:
controlling the first body and the second body to enter an attached state based on a force balance between the first body and the second body.

12. The method of claim 1, wherein the force balance is obtained by an equation $$F_1 \times L_1 = F_2 \times L_2 + G \times L_3,$$

where $F_1$ denotes a magnetic force between the first body and the second body,
$L_1$ denotes a length of arm of the force $F_1$ from a force application center,
$F_2$ denotes a force applied by a user on the second body,
$L_2$ denotes a length of arm of the force $F_2$ from the force application center,
G denotes a gravity force applied on the second body, and
$L_3$ denotes a length of arm of the gravity force from the force application center.

13. An electronic device, comprising:
a first body;
a second body that can be attached to the first body;
an obtaining module configured to obtain an attachment position at which the first body is attached to the second body;
a first control module configured to control the electronic device to operate in a first mode when the first body is attached to the second body at a first attachment position; and
a second control module configured to control the electronic device to operate in a second mode when the first body is attached to the second body at a second attachment position,
wherein the first attachment position is different from the second attachment position, and the first mode is different from the second mode;

wherein the first body further comprises: a first connection device comprising a first connector and a second connector, wherein the first connector and the second connector are coupled in a wedge-shaped arrangement at a first end of the first body, or arranged separately at the first end of the first body;

wherein the second body comprises: a second connection device comprising a first sub-connector corresponding to the first connector and a second sub-connector corresponding to the second connector, wherein the electronic device operates in the first mode when the first body is attached to the second body by connection between the first connector and the first sub-connector, and wherein the electronic device operates in the second mode when the first body is attached to the second body by connection between the second connector and the second sub-connector.

14. The electronic device of claim 13, wherein the obtaining module comprises:
a generating unit configured to generate a pulse signal in response to a movable contact provided at the attachment position being pressed, when the first body is being attached to the second body; and
an obtaining unit configured to obtain the attachment position at which the first body is attached to the second body based on the pulse signal.

15. The electronic device of claim 13, wherein the obtaining unit is further configured to:
obtain the attachment position from a sensor provided at the attachment position when the first body is being attached to the second body.

16. The electronic device of claim 13, wherein the first control module comprises:
a first determining unit configured to determine that a connection between the first body and the second body is in a first connection state when the first body is attached to the second body at the first attachment position; and
a first responding unit configured to cause the first system to enter a normal operation mode in response to the first connection state.

17. The electronic device of claim 13, wherein the second control module comprises:
a second determining unit configured to determine that a connection between the first body and the second body is in a second connection state when the first body is attached to the second body at the second attachment position; and
a second responding unit configured to cause the first system to enter an abnormal operation mode in response to the second connection state.

18. The electronic device of claim 13, further comprising:
a judging module configured to judge whether a first attachment point in the first body is connected to a second attachment point in the second body after the obtaining modules obtains the attachment position at which the first body is attached to the second body;
a third control module configured to control the electronic device to operate as a notebook computer if the judging unit judges that the first attachment point is connected to the second attachment point;
a fourth control module configured to control the electronic device to operate as a tablet computer if the judging unit judges that the first attachment point is not connected to the second attachment point.

19. The electronic device of claim 13, wherein the second body further comprises:
a display;
a second system comprising a second hardware system and a second operating system running on the second hardware system;
wherein the first control module is configured to cause:
each of the first and second systems to determine that a connection between the first body and the second body is in a first connection state when the first body is attached to the second body at the first attachment position;
the first system to control a change in its own system state in accordance with a predetermined policy based on its own system state information and the first connection state;
the second system to control a change in its own system state in accordance with a predetermined policy based on its own system state information and the first connection state, and
wherein the second control module is configured to cause:
each of the first and second systems to determine that a connection between the first body and the second body is in a second connection state when the first body is attached to the second body at the second attachment position;
the first system to control a change in its own system state in accordance with a predetermined policy based on its own system state information and the second connection state;
the second system to control a change in its own system state in accordance with a predetermined policy based on its own system state information and the second connection state.

20. The electronic device of claim 13, wherein
the first connection device comprises a first magnet, the first connector comprises a first magnet component, and the second connector comprises a second magnet component;
the second connection device comprises a second magnetic device, the first sub-connector comprises a first magnetic sub-device corresponding to the first magnet component, and the second sub-connector comprises a second magnetic sub-device corresponding to the second magnet component,
the electronic device operates in the first mode when the first body is attached to the second body by attraction between the first magnet component and the first magnetic sub-device, and
the electronic device operates in the second mode when the first body is attached to the second body by attraction between the second magnet component and the second magnetic sub-device.

* * * * *